(12) United States Patent
Oskiper et al.

(10) Patent No.: US 8,305,430 B2
(45) Date of Patent: Nov. 6, 2012

(54) SYSTEM AND METHOD FOR MULTI-CAMERA VISUAL ODOMETRY

(75) Inventors: Taragay Oskiper, East Windsor, NJ (US); John Fields, Princeton Junction, NJ (US); Rakesh Kumar, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 1809 days.

(21) Appl. No.: 11/532,897

(22) Filed: Sep. 18, 2006

(65) Prior Publication Data

US 2007/0115352 A1    May 24, 2007

Related U.S. Application Data

(60) Provisional application No. 60/717,722, filed on Sep. 16, 2005.

(51) Int. Cl.
*H04N 13/00* (2006.01)
(52) U.S. Cl. ............................................. 348/47; 348/48
(58) Field of Classification Search .................. 348/0.47, 348/0.48
See application file for complete search history.

(56) References Cited

U.S. PATENT DOCUMENTS

2004/0105580 A1* 6/2004 Hager et al. .................. 382/154
2004/0227820 A1* 11/2004 Nister ....................... 348/207.99

OTHER PUBLICATIONS

G. Adiv, Inherent Ambiguities in Recovering 3-D Motion and Structure from a Noisy Flow Field, IEEE Transactions on Pattern Analysis and Machine Intelligence, vol. 11, No. 5, pp. 477-489, May 1989.

A. Davison, Real-Time Simultaneous Localisation and Mapping with a Single Camera, IEEE Interntional Conference on Computer Vision, pp. 1403-1410, 2003.
M. Fischler and R. Bolles, Random Sample Consensus: A Paradigm for Model Fitting with Applications to Image Analysis and Automated Cartography, Communications of the ACM, vol. 24, pp. 381-395, Jun. 1981.
A. Fitzbgibbon and A. Zisserman, Automatic Camera Recovery for Closed or Open Image Sequences, Proc. European Conference on Computer Vision, pp. 311-326, 1998.
J.M. Frahm, K. Koser, and R. Koch, Pose Estimation for Multi-Camera Systems, Proceedings of DAGM'04, pp. 286-293, 2004.
C. Harris and M. Stephens, A Combined Corner and Edge Detector, Proc. Fourth Alvey Vision Conference, pp. 147-151, 1988.
M. Montemerlo and S. Thrun, Simultaneous Localization and Mapping with Unknown Data Association Using FastSLAM, IEEE International Conference on Robotics and Automation, pp. 1985-1991, Sep. 2003.

(Continued)

*Primary Examiner* — Sath V Perungavoor
*Assistant Examiner* — Jeffery Williams
(74) *Attorney, Agent, or Firm* — Moser Taboada

(57) ABSTRACT

A visual odometry system and method for a fixed or known calibration of an arbitrary number of cameras in monocular configuration is provided. Images collected from each of the cameras in this distributed aperture system have negligible or absolutely no overlap. The relative pose and configuration of the cameras with respect to each other are assumed to be known and provide a means for determining the three-dimensional poses of all the cameras constrained in any given single camera pose. The cameras may be arranged in different configurations for different applications and are made suitable for mounting on a vehicle or person undergoing general motion. A complete parallel architecture is provided in conjunction with the implementation of the visual odometry method, so that real-time processing can be achieved on a multi-CPU system.

12 Claims, 5 Drawing Sheets

OTHER PUBLICATIONS

J. Neumann, C. Fermuller, and Y. Aloimonos, Polydioptric Cameras: New Eyes for Structure from Motion, Proceedings of DAGM'02, pp. 618-625, 2002.

D. Nister, An Efficient Solution to the Five-Point Relative Pose Problem, IEEE Transactions on Pattern Analysis and Machine Intelligence, vol. 26, Issue 6, pp. 756-770, Jun. 2004.

D. Nister, Preemptive RANSAC for Live Structure and Motion Estimation, IEEE International Conference on Computer Vision, pp. 199-206, 2003.

D. Nister, O. Naroditsky, and J. Bergen. Visual Odometry, IEEE Computer Society Conference on Computer Vision and Pattern Recognition, pp. 652-659, 2004.

C. Olson, L. Matthies, M. Schoppers and M. Maimone, Robust Stereo Ego-Motion for Long Distance Navigation, IEEE Conference on Computer Vision and Pattern Recognition, pp. 453-458, 2000.

S. Se, D. Lowe and J. Little, Vision-Based Global Localization and Mapping for Mobile Robts, IEEE Transactions on Robotics, vol. 21, Issue 3, pp. 364-375, Jun. 2005.

S. Se, D. Lowe, and J. Little, Mobile Robot Localization and Mapping with Uncertainty Using Scale-Invariant Visual Landmarks, International Journal of Robotics Research, vol. 21, No. 8, pp. 735-758, Aug. 2002.

J. Shi and C. Tomasi, Good Features to Track, IEEE Conference on Computer Vision and Pattern Recognition, pp. 593-600, 1994.

* cited by examiner

SYSTEM AND METHOD FOR MULTI-CAMERA VISUAL ODOMETRY

CROSS-REFERENCE TO RELATED APPLICATIONS

This application claims the benefit of U.S. Provisional Patent Application No. 60/717,722, filed Sep. 16, 2005, which is incorporated by reference herein in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DAAB07-01-9-L504 awarded by DARPA.

BACKGROUND OF THE INVENTION

1. Field of the Invention

The present invention relates to the field of video image processing. More particularly, the present invention is directed to visual odometry methods for a distributed aperture system.

2. Description of the Prior Art

An important aspect of today's computer vision systems is in the recovery and processing of three-dimensional pose (i.e., position and orientation) information associated with mobile video sensors. This is particularly useful in autonomous navigation of vehicles and robots, route visualization, match movement and augmented reality applications. The effective use of video sensors in obstacle detection and navigation has been an ongoing objective in the field of ground vehicle robotics for many years and, as more advanced computational components become available, will continue to be a growing area of interest in the thriving realm of computer vision.

Simultaneous localization and mapping (SLAM) is a technique that is commonly employed in technological areas employing autonomous or preprogrammed tasks, such as in the field of robotics. This particular technique may be used by a robot, for example, to construct a map of an unfamiliar environment while simultaneously keeping track of its current position. However, there are inherent uncertainties in discerning relative movement from various sensors. For example, if there is a slight inaccuracy in the measured distance and direction traveled during an iteration of the mapping sequence, then errors will be traversed to subsequent features added to the map. When these positional errors go unchecked or undetected, the map becomes grossly distorted and, therefore, the ability to precisely determine location becomes significantly compromised.

The SLAM technique is often performed using range type sensors rather than ordinary passive two-dimensional cameras. Typically, the SLAM technique is performed utilizing active three-dimensional laser imagining detection and ranging (LIDAR). Yet, successfully developing a robust SLAM structure from motion systems, which can be configured to function over significantly longer periods of time using video data from passive two-dimensional cameras, continues to remain a challenge.

Considerable amounts of time and research are concentrated in the area of visual odometry. Relatively recent improvements in the performance of both sensors and computing hardware have made real-time vision processing more practical. As computer vision algorithms continue to mature, more visually based navigation systems will become available. Previously published methods for visual odometry have employed video streams from one or two moving cameras in monocular and binocular configurations. In addition, research and development of invariant feature matching has lead to landmark based three-dimensional motion tracking systems.

Although these developments are impressive and continue to contribute to improved methods for implementing visual odometry, they are still deficient in that they lack the robustness necessary for autonomous applications over extended periods of time. Various factors can contribute to and result in the break down of algorithms, such as, the familiar problematic dropping of video frames during turning maneuvers, presence of artifacts during video capture, video frames comprised of minimal image features or no image features at all, significant foreground object motion obscuring an imaged scene and/or considerable sensor motion preventing reliable tracking of image features.

The aforementioned shortcomings are addressed in accordance with the principles of the present invention, wherein an improved visual odometry method for a distributed aperture system is provided.

SUMMARY OF THE INVENTION

It is an object of the present invention to provide a means for exploiting features across a wide swath of an imaged scene in order to create an exceptionally high degree of robustness to the presence of independent foreground object motion and lack of quality trackable features in any particular portion of the imaged scene.

It is another object of the present invention to provide a means for landmark matching of features across multiple cameras and over time in order to create an exceptionally high degree of robustness to dropped frames, as well as other system or capture failures, that may occur during critical maneuvers that are known to break a tracking process.

It is yet another object of the present invention to provide improved precision in the tracking of points across multiple cameras over a wide field of view, which in turn provides for sufficiently strong constraints in the estimation of three-dimensional motions of the video sensor.

These and other objects are accomplished in accordance with the principles of the present invention, wherein the novelty of the present invention will become apparent from the following detailed description and appended claims.

The present invention is an improved visual odometry method for a fixed or known configuration of an arbitrary number of cameras in monocular configuration. Images collected from each of the cameras in this distributed aperture system have negligible or absolutely no overlap. The relative pose and configuration of the cameras with respect to each other may change but are assumed to be known, or are computed by an independent method, at any instance of time. The cameras may be arranged in different configurations for different applications and are made suitable for mounting on a vehicle or person undergoing general motion (6 degrees of freedom due to rotation and translation). Furthermore, the present invention is implemented with a complete parallel architecture, so that real-time processing can be achieved on a multi-CPU system, where all the single camera related computations which comprise the majority of the computational load remain the same and can be carried out in real time by separate CPUs.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

Figure 1:
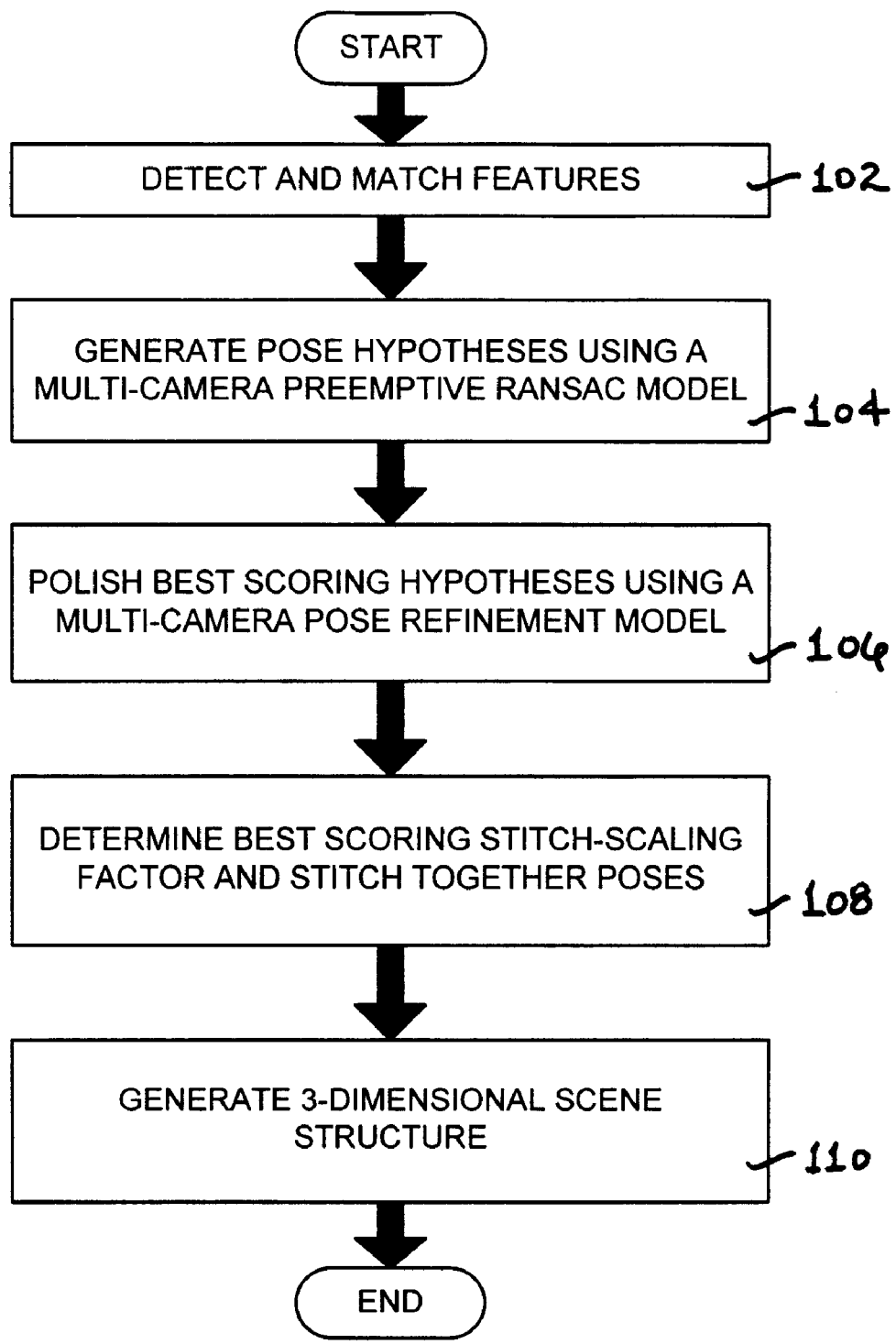
FIG. 1 illustrates a general flowchart of the stages employed in the multi-camera visual odometry method in accordance with a preferred embodiment of the present invention.

It is to be understood that the above-identified drawing figures are provided for purposes of illustrating the preferred embodiments of the present invention and are not intended to be limiting in scope.

DETAILED DESCRIPTION OF THE PREFERRED EMBODIMENTS

The present invention is directed to improved visual odometry methods for a distributed aperture system. For purposes of clarity, and not by way of limitation, illustrative views of the present invention are described with references made to the above-identified figures. Various modifications obvious to one skilled in the art are deemed to be within the spirit and scope of the present invention.

In a distributed aperture system employing multiple cameras, visual odometry is typically applied in each of the cameras individually for purposes of estimating the pose of each of the cameras. However, due to the relative poses of each of the cameras being of a fixed and known configuration, single-camera results are constrained. In order to take advantage of these constraints, it is necessary to provide a method for computing the poses of all the cameras in a distributed aperture system given the pose of any one camera. The present invention takes advantage of these constraints by employing a method for transferring pose across different cameras in the distributed aperture system. This pose transfer mechanism allows for each camera generated pose to be evaluated on the entire system, resulting in all camera pose candidates in the distributed aperture system being evaluated on the same (global) dataset and, thereby, ultimately enabling the selection process of the best pose to be exceptionally robust.

In the present invention, the pose of camera j in the world at time t is determined by a rotation matrix $R_{wj}(t)$ and a translation vector $T_w^j(t)$ that map the world; point $X_w$ to the camera point $X_j$:

$$X_j = R_{wj}(t)X_w + T_w^j(t) \quad (1)$$

This transformation may also be expressed as $$\begin{pmatrix} X_j \\ 1 \end{pmatrix} = P_{wj}(t) \begin{pmatrix} X_w \\ 1 \end{pmatrix}, \text{ where } P_{wj}(t) = \begin{pmatrix} R_{wj}(t) & T_w^j(t) \\ 0 & 1 \end{pmatrix}.$$

Similarly, the pose of camera k relative to camera j is described by $P_{jk}$ such that $$\begin{pmatrix} X_k \\ 1 \end{pmatrix} = P_{jk} \begin{pmatrix} X_j \\ 1 \end{pmatrix} \quad (2)$$

The intrinsic calibration parameters and the relative poses $P_{jk}$ between every camera pair in the distributed aperture system are made available through an initial calibration. We can write $P_{jk} = P_{wk}(t) P_{jw}(t)$, which is assumed fixed in time, by expressing the same world point in terms of camera j and camera k coordinates. Note that $P_{jw}(t) = P_{wj}^{-1}(t)$. So, if $P_{wj}(t)$ and $P_{jk}$ are known, then:

$$P_{wk}(t) = P_{jk} P_{wj}(t) \quad (3)$$

In employing the visual odometry method of the present invention, we obtain at time step $t_1$ for camera j, the camera pose in the coordinate system of that camera at time $t_0=0$. Let us denote this by $P_j(t_0,t_1)$, the matrix, which transforms coordinates for camera j at time $t_0$ to coordinates for camera j at time $t_1$. Then, we have the following relationship:

$$P_j(t_0,t_1) = P_{wj}(t_1) P_{jw}(t_0) \quad (4)$$

Given $P_j(t_0,t_1)$ and the relative pose $P_{jk}$, we can compute $P_k(t_0,t_1)$:

$$P_k(t_0, t_1) = P_{wk}(t_1) P_{kw}(t_0) \quad (5)$$

$$= P_{jk} P_{wj}(t_1) P_{jw}(t_0) P_{jk}^{-1}$$

$$= P_{jk} P_j(t_0, t_1) P_{kj}.$$

In terms of rotation, R, and translation, T, this result can be written as follows:

$$R_k(t_0,t_1) = R_{jk} R_j(t_0,t_1) R_{kj}, \quad (6)$$

$$T_k(t_0,t_1) = R_{jk} R_j(t_0,t_1) T_k^j + T_j^k + R_{jk} T_j(t_0,t_1) \quad (7)$$

where $T_j^k = -R_{jk} T_k^j$.

Therefore, given the aforementioned relation between camera poses for a fixed and known configuration, the poses of all the cameras in a distributed aperture system constrained by any given single camera pose can now be determined.

FIG. 1 illustrates a generalized overview of the stages employed in the visual odometry process of the present invention, wherein the processes and their results are described in greater detail in conjunction with the remaining accompanying drawing figures. The process is initiated at stage 102, executing a feature detection and matching method independently in each of the cameras in the distributed aperture system, which specifically entails the extraction of multiple key points present in each frame for all of the cameras in the distributed aperture system and finding matches between frames. Harris corners, for example, may be utilized for establishing such a feature track. A Harris corner detector searches for points having significant corner strengths. This type of point feature has been found to give detections that are relatively stable under small to moderate image distortions. Each feature correspondence establishes a feature track, which lasts as long as it is matched in the new frames that are acquired. As old tracks vanish, new ones are established with features that have not been previously observed. The feature tracks in each of the cameras are later fed into a pose estimation method (stage 104). It should be noted that the use of Harris corners for establishing a feature track are provided merely for purposes of an exemplary illustration and not by way of limitation, and that any suitable feature detector that is similarly proficient in describing an image point in a distinctive manner may be utilized in accordance with the preferred embodiments of the present invention.

After a predefined number of feature tracks from each of the cameras in the distributed aperture system are generated, they are subjected to a pose estimation method at stage 104. The pose estimation method utilized at stage 104 may be a random sample consensus (RANSAC) model, which is used to estimate parameters from a set of observed data that contain outliers. The RANSAC model is one of many ways of dealing with outliers arising from incorrect matches. Although, other hypothesize-and-test frameworks do exist and are typically used for acquiring similar estimations. Yet again, for purposes of illustration and not by way of limitation, the present invention is described in conjunction with the generation of pose hypotheses utilizing a RANSAC estimation model. More specifically, the present invention utilizes a preemptive RANSAC model, such as the one described in commonly owned U.S. Publication Application No. US 2004/0227820, which is hereby incorporated by reference herein in its entirety.

When employed in a monocular configuration, the preemptive RANSAC process randomly selects five point correspondences over three views. An N number of pose hypotheses (e.g., by default N=500) are generated using the 5-point algorithm, wherein each of these pose hypotheses consists of the pose of the second and third view with respect to the first view. All the generated hypotheses are then evaluated on chunks of M data points (e.g., by default M=100) based on a trifocal Sampson error, each time dropping out half of the least scoring hypotheses. Thus, initially we start with 500 hypotheses, all of which are evaluated on a subset of 100-point correspondences. Then they are sorted according to their scores on this data set and the bottom half is removed. Thereafter, another set of 100 data points are selected on which the remaining 250 hypotheses are evaluated, again removing the least scoring half. This process continues the reiteration scheme until we are left with a single best-scoring hypothesis.

Figure 2A:
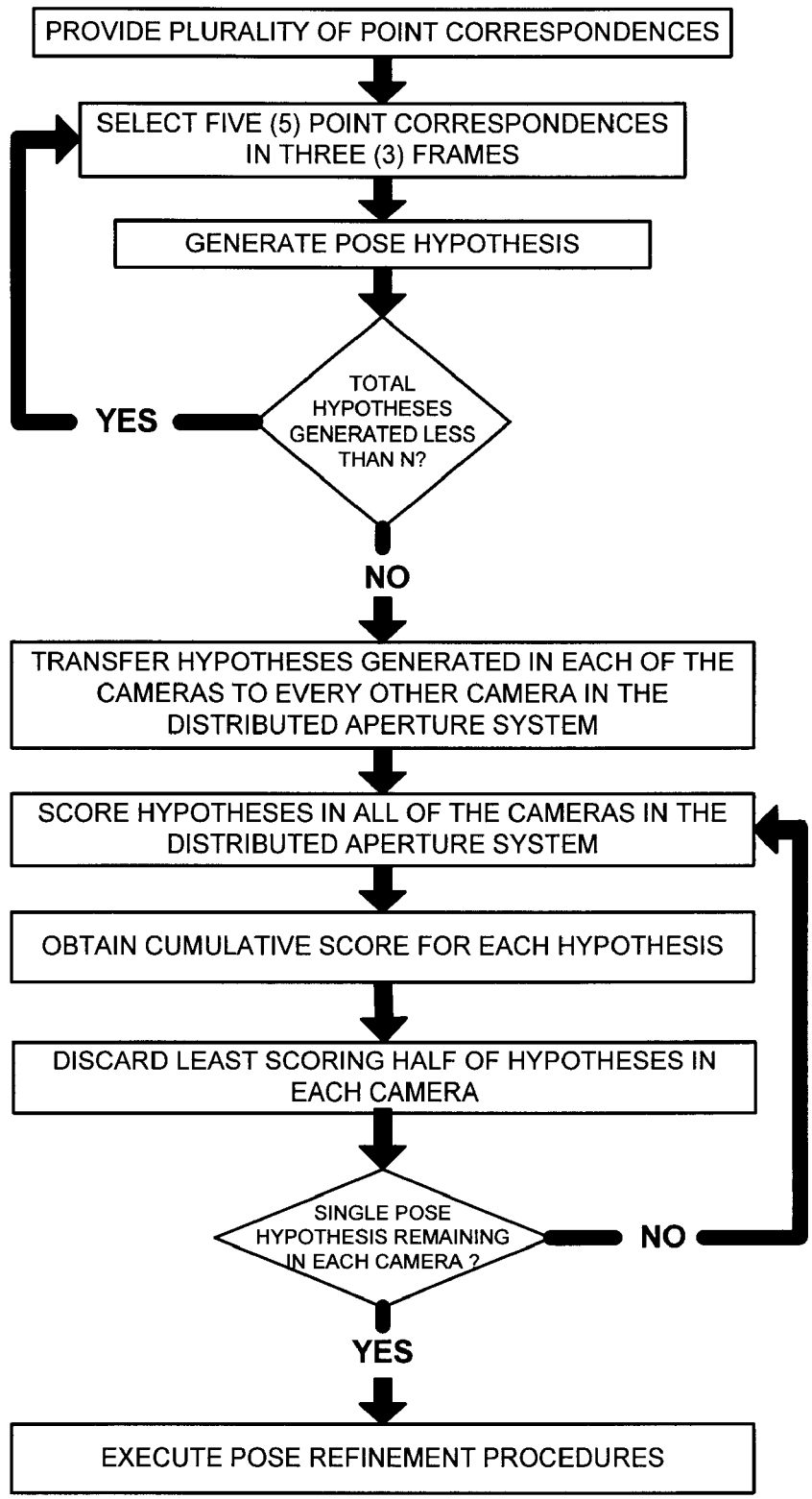
FIGS. 2A and 2B illustrate, respectively, a flowchart depicting the steps employed for pose generating hypotheses in each camera and a block diagram depiction of the pose hypotheses generation in relation to the multi-camera system in accordance with a preferred embodiment of the present invention.
Figure 2B:
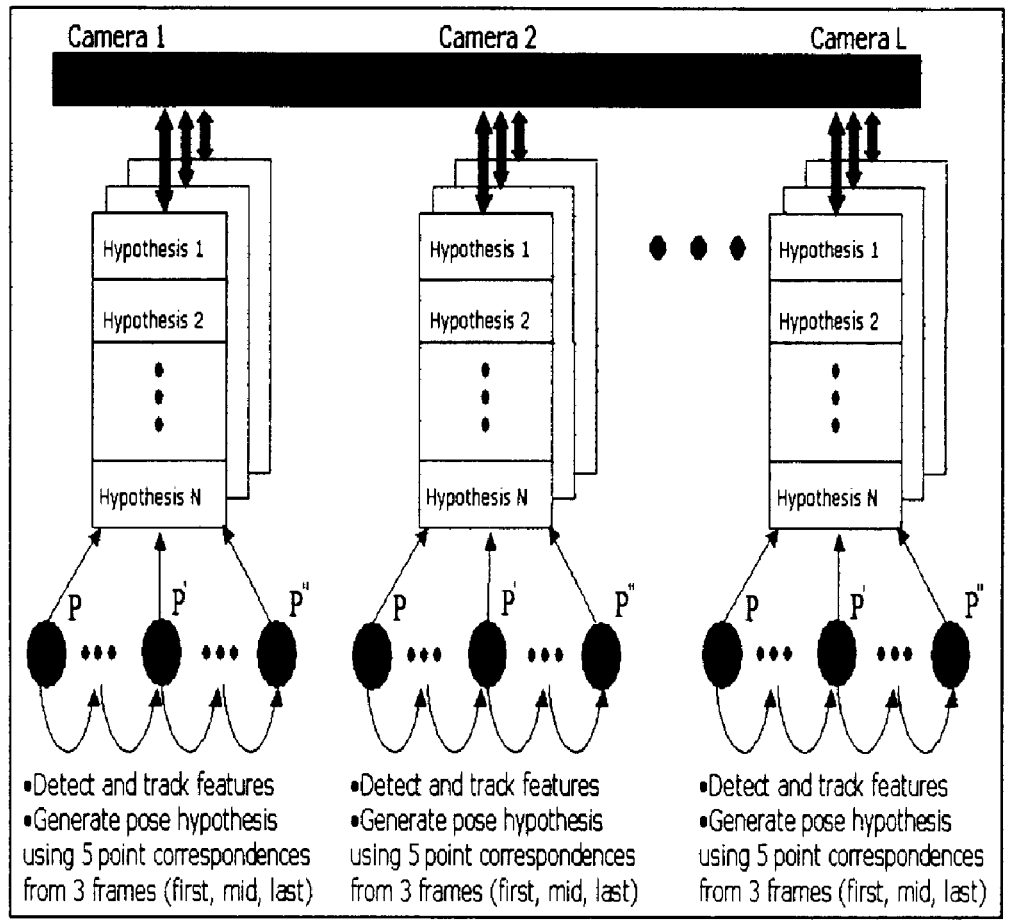

In the multi-camera configuration of the present invention, a preemptive RANSAC is implemented as illustrated in FIGS. 2A and 2B. Similar to the monocular configuration, each of the cameras in the distributed aperture system of the present invention are configured to independently generate 500 pose hypotheses that are based on randomly selected five point correspondences using their own data. Therefore, as illustrated in FIG. 2A, a plurality of point correspondences are made available at step 202, wherein five point correspondences are then selected from three video frames at step 204. A pose hypothesis is then generated, at step 206, on the selected point correspondences using the previously identified preemptive RANSAC model. Hypotheses are continuously generated based on a set of previously selected point correspondences until a predefined number of hypotheses, a condition that is checked at step 208 after every generation of a pose hypothesis at step 206, are ultimately generated. For example, if N is set at the aforementioned default value of 500, then the system will reiterate the pose generation scheme until 500 pose hypotheses have been generated in connection with the corresponding camera.

In an alternative embodiment, an improvement can be realized by selecting five points across different cameras to compute the initial pose estimations for use in the RANSAC method. For instance, in the visual odometry method of the present invention the five point correspondences are selected in each camera separately. In this way, solving for the monocular camera pose can be used directly by the distributed aperture system without any modification. However, by further implementing an additional method for selecting these point matches from different cameras, we may further solve for the entire system pose satisfying those constraints and, therefore, further enhance the performance by taking direct advantage of the wide field of view provided by the multiple cameras provided in the distributed aperture system.

Unlike the monocular configuration, all the hypotheses generated in each of the cameras of the distributed aperture system are evaluated not only on the camera that generated them, but are also evaluated, at step 212, in every other camera after they have been transformed properly throughout, at step 210, to all the cameras in the distributed aperture system. FIG. 2B is an exemplary block diagram illustration of the transfer of pose hypothesis in the multi-camera system of the present invention. This mechanism provides a means for global scoring of a given camera pose in the multi-camera system, in which a combined score is provided for a particular pose hypothesis after it is transformed and scored in conjunction with each of the camera's data in the distributed aperture system. Having transferred all the pose candidates to every other camera in the distributed aperture system, wherein the number of hypotheses generated in each camera is set to be 500 hypotheses and the number of non-overlapping cameras provided in the distributed aperture system are eight, a total of 4000 (i.e., 500 hypotheses×8 cameras) hypotheses can be generated. However, by subsequently sharing each of the camera's hypotheses between all the other cameras' hypotheses, then a total of 32,000 (i.e., 4000 hypotheses×8 cameras) hypotheses are generated for the entire distributed aperture system.

Thereafter, preemptive scoring is executed at step 214. The preemptive scoring in each camera in the distributed aperture system is accomplished by obtaining a cumulative score for each hypothesis after combining its corresponding scores received from each of the cameras on the initial set of data points from each camera. The least scoring half of hypotheses (based on their cumulative score) in each camera are then discarded, at step 216. This process is continuously reiterated and the remaining half of the hypotheses in each camera is again subjected to an evaluation on another set of the randomly selected data points in each of the cameras in the distributed aperture system. When the required number of iterations of this process have been executed and the condition provided at step 218 is satisfied, each camera in the distributed aperture system will be left with the best pose hypothesis generated by that camera. These remaining pose hypotheses are then subjected to pose refinement stage 106 initiated at step 220 and detailed in the following description of FIG. 3.

Figure 3:
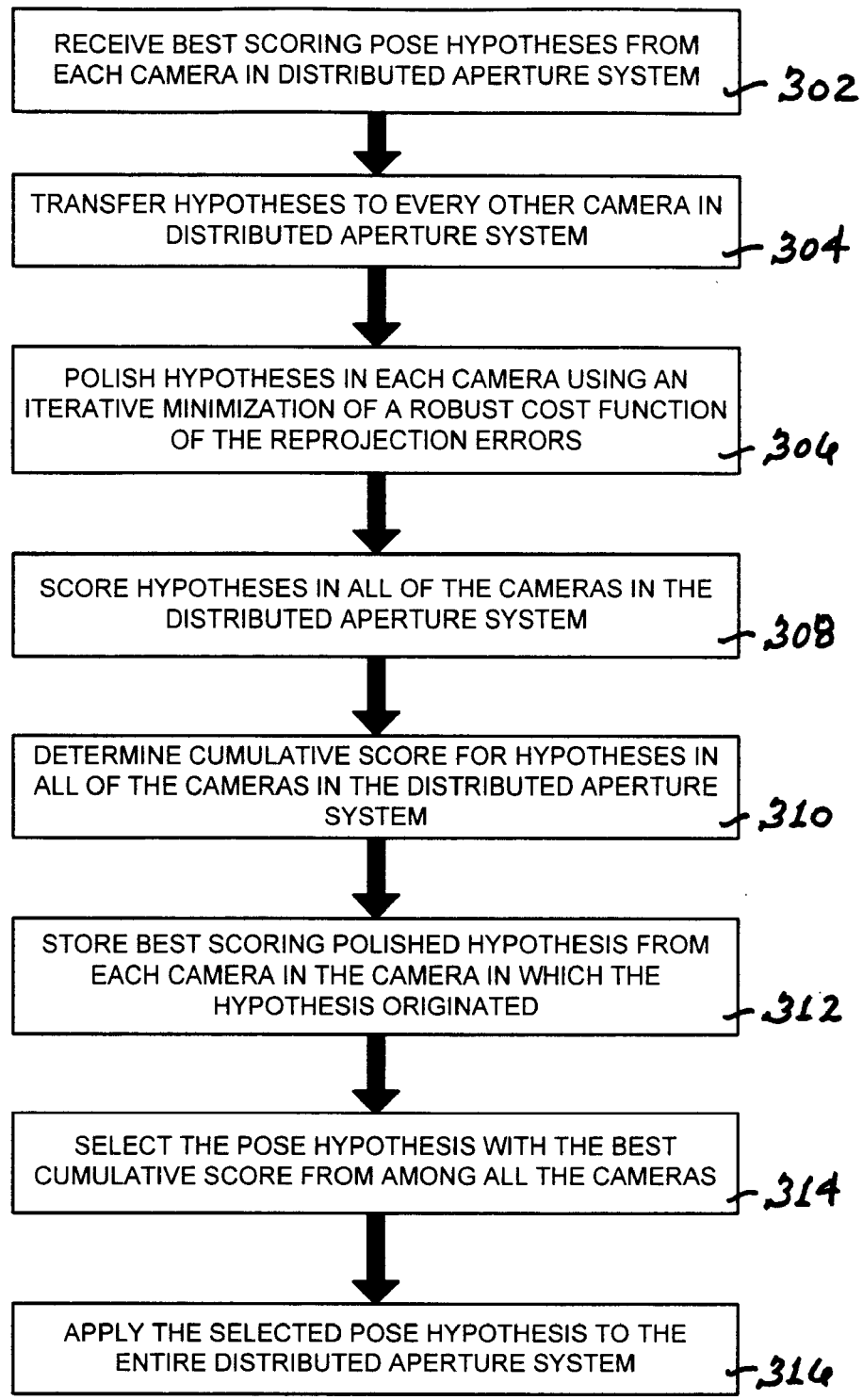
FIG. 3 illustrates a flowchart depicting the steps employed for polishing the best scoring pose hypotheses generated in accordance with a preferred embodiment of the present invention.

The best pose hypothesis now provided in each of the cameras in the distributed aperture system at the end of preemptive RANSAC stage 104 are passed to pose refinement stage 106 and a polishing routine is implemented in accordance with the steps illustrated in the flowchart of FIG. 3. At step 302, the best scoring hypothesis from each camera is received and then transferred, at step 304, to each of the other cameras in the distributed aperture system. The best cumulative scoring hypotheses provided to each of the cameras in the distributed aperture system are then polished, at step 306, where iterative minimization of a robust cost function, derived from the Cauchy distribution, of reprojection errors is performed through the Levenberg-Marquardt method. Therefore, for each camera, the best cumulative scoring hypothesis is polished not only on the camera from which it originated but also on all the cameras in the distributed aperture system.

The cumulative scores of these polished hypotheses in each camera are computed at step 308 and the best cumulative scoring hypothesis from among all the polished hypotheses in each camera is determined at step 310. The best scoring hypothesis from each camera is then stored, at step 312, in the camera from which it originated, however, it is transferred to the current camera if the best pose hypothesis comes from a different camera other than the original. This process is repeated for all the cameras in the distributed aperture system. At the end, each camera will have obtained a polished pose. Pose refinement implemented in accordance with the aforementioned described manner is advantageous in that a given camera pose may be polished better in another camera and thereby acquire a better overall global score. At step 314, the camera possessing the best cumulative score from among all the cameras is selected and applied, at step 316, to the entire distributed aperture system. In an alternative embodiment, instead of comparing the cumulative scores at the very end of the polishing step, it can be done at every iteration during polishing, by computing the best pose and transferring it to all the cameras for the next iteration. In this way, multi-camera polishing is utilized at a deeper level, however, at the expense of computational complexity due to additional pose transfers.

To contribute to the generation of the three-dimensional structure of the scene at stage 110, the poses must undergo a pose-stitching scheme provided at stage 108 of the visual odometry method. When using a single camera visual odometry method, pose estimates are obtained over every three views, wherein the poses for the second and third view are with respect to the camera coordinate frame in the first view. In order to stitch these poses, they are placed in the coordinate system of the first camera position corresponding to the first frame in the video sequence. At this point, the scale factor for the new pose-set (i.e., poses corresponding to the second and third views in the current triple) is also estimated with another RANSAC scheme.

In the multi-camera system, the scale factor obtained from each camera is evaluated in all the cameras after it is transferred to every other camera. Then the cumulative scores for the scale factors are compared and the best scoring scale factor is used for the entire system. Scale transfer is done according to following formula: Let $R_j(t_0,t_1)$ and $T_j(t_0,t_1)$ be the pose information for camera j. Let the scale factor determined for this camera be $s_j$. Then the scale corrected pose would be $R_j(t_0,t_1)$ and $T_j(t_0,t_1)s_j$. Transferring this pose to the coordinate system of camera k, we get $$R_k(t_0,t_1) = R_{jk}R_j(t_0,t_1)R_{kj} \qquad (8)$$

$$T_k(t_0,t_1) = R_{jk}R_j(t_0,t_1)T_k^j + T_j^k + R_{jk}T_j(t_0,t_1)s_j. \qquad (9)$$

However, there is still a scale ambiguity in the final pose of the multi-camera system. Therefore, in order to recover the global scale factor, simultaneous GPS data may also recorded. Velocity information from GPS readings may be used to determine the actual distance traveled, from which the overall scale factor for poses in between two readings are recovered by comparing it to the distance calculated according to the visual odometry pose information. So starting with the first frame until the first GPS reading, the aforementioned automatic pose stitching mechanism is applied. Then, with the first GPS reading, an overall scale correction is computed for all the camera poses gathered so far. The system may then start anew with all the poses from then on computed relative to the most recent frame until the next GPS reading. At this point, an overall scale correction is computed as before and all the camera poses gathered so far are placed in the common coordinate frame. It should be noted, that the present invention is not limited to the use of GPS to acquire velocity readings. Any other suitable method, which computes velocity or distance traveled periodically, may be used for the scale adjustment detailed above.

In an another embodiment, which does not require the use of GPS or a similar alternative, one or several of the cameras in the distributed aperture system may be stereo units. By utilizing stereo units, the three-dimensional structure of a scene can be recovered in an absolute coordinate system. The scale is then computed by ensuring that the absolute three dimensional structure recovered from the stereo cameras is rigidly transformed from one time instant to another. A multi-camera configuration where some of the cameras have overlap with each other and recover absolute three-dimensional structure of the scene and scale using these cameras may also be used.

Figure 4:
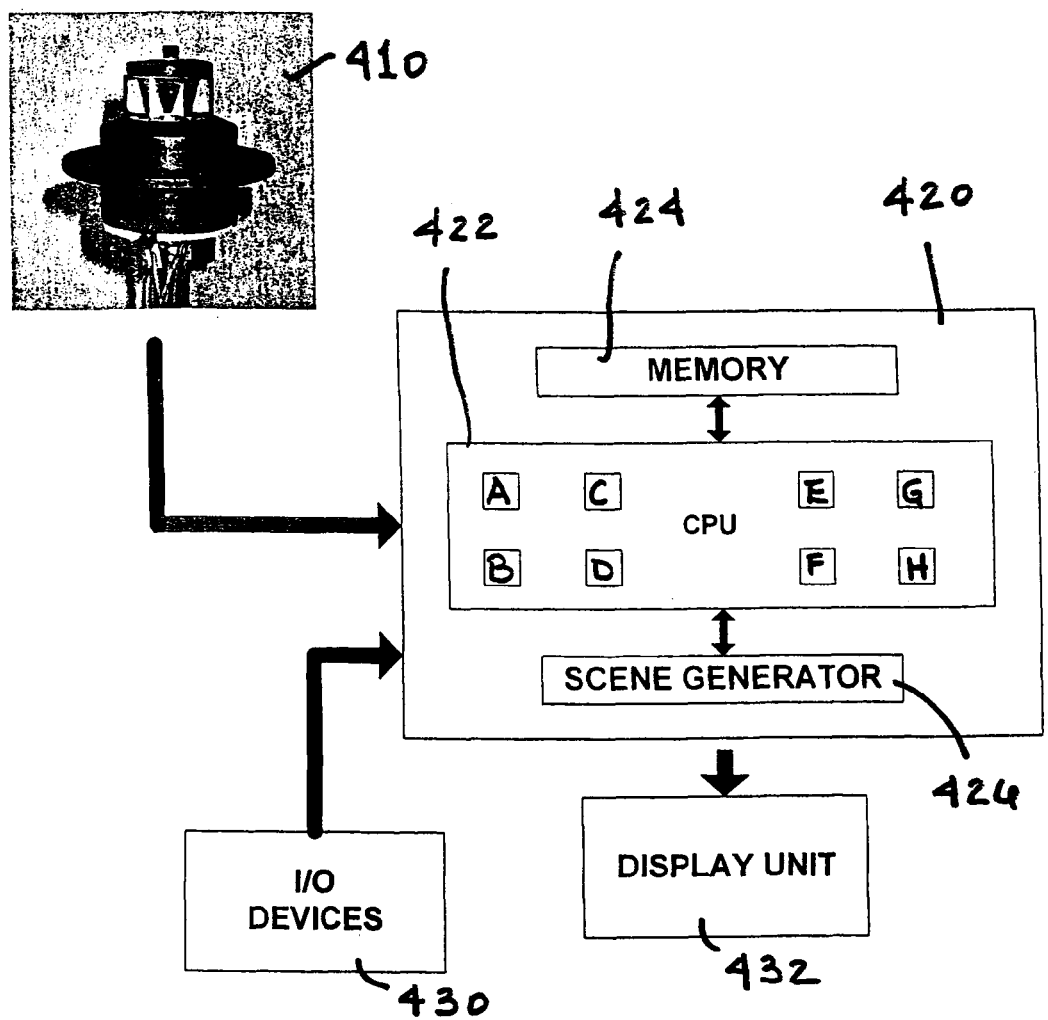
FIG. 4 illustrates a block diagram of a exemplary distributed aperture system having an eight-camera turret in accordance with a preferred embodiment of the present invention.

An exemplary distributed aperture system 400 for which data captured is subjected to the visual odometry method described in detail above is illustrated in FIG. 4. Distributed aperture system 400 may be comprised, for example, of an eight-camera turret 410 having a 360-degree panoramic coverage and thereby providing, as previously mentioned, images from each of the cameras with no overlap. The visual odometry method may be implemented on the images captured by the cameras of multi-camera turret 410 using, for example, a computer 420 having a processor unit 422, a memory component 424 and a scene generator 426. Processor unit 422 may be comprised of multiple CPU processors 422A, 422B, 422C, 422D, 422E, 422F, 422G and 422H. Each of the CPU processors may be designated to a single camera provided on multi-camera turret 410 to allow for real-time processing of images as previously described above. System 400 may also be comprised of input and output devices 430, such as, a storage device, a receiver, a transmitter, sensors, a control module (e.g., a keyboard), a clock or any other applicable device. The ultimate three-dimensional scene structure generated after implementation of the multi-camera visual odometry method of the present invention may then be provided on a display 432.

In the 360-degree turret video provided by multi-camera turret 410, it is readily observed that as a vehicle turns, one view that is visible in a given camera will soon be available in a neighboring camera. Therefore, by further configuring the visual odometry method of the present invention, pose estimates between two such views (across all neighboring cameras) can further provide valuable information with regards to the determination of possible instances where a system output may not be reliable and, thereby, prevent the accumulation of gross errors. Local landmark matching performed across different cameras, therefore, provides a mechanism for further error correction and robustness. In light of the multi-camera visual odometry system and method described in detail above, there are clearly a plurality of improvements that can be achieved in three-dimensional pose tracking.

One skilled in the art will appreciate that the present invention can be practiced by other than the described embodiments, which are presented for purposes of illustration and not by way of limitation, and the present invention is limited only by the claims that follow.

What is claimed is:

1. A method for tracking a three-dimensional pose based on video captured in a distributed aperture having a multi-camera configuration, comprising the steps of:
   generating a plurality of pose hypotheses in each camera of said multi-camera configuration;
   transferring said plurality of pose hypotheses generated in each camera to all cameras in said multi-camera configuration;
   scoring each of said plurality of pose hypotheses generated in and transferred to each camera;
   determining a cumulative score for each of said plurality of pose hypotheses generated in and transferred to each camera;
   discarding least scoring pose hypotheses in each camera; and
   executing a pose refinement on a best scoring pose hypothesis remaining in each camera.

2. The method of claim 1, wherein said plurality of pose hypotheses generated in each camera are based on randomly selected point correspondences from a plurality of point correspondences generated in response to features detected and matched in video frames.

3. The method of claim 1, wherein transferring said plurality of pose hypotheses provides each camera with all pose hypotheses generated in all cameras of said multi-camera configuration.

4. The method of claim 1, wherein said cumulative score is determined for a particular pose hypothesis by combining the scores from each camera associated with said pose hypothesis.

5. The method of claim 1, wherein discarding of hypotheses further comprises discarding a least scoring half of pose hypotheses in each camera.

6. The method of claim 5, wherein discarding said least scoring half of pose hypotheses is reiterated until there is a single best pose hypothesis remaining in each camera.

7. The method of claim 1, wherein executing said pose refinement further comprises:
   transferring said best scoring pose hypothesis in each camera to all cameras in said multi-camera configuration;
   polishing said best scoring pose hypotheses in each camera;
   scoring each of said polished best scoring pose hypotheses in each camera;
   determining a cumulative score for each of said polished best scoring pose hypothesis;
   selecting one of said polished best scoring pose hypothesis having a best said cumulative score from each camera; and
   storing said polished best scoring pose hypothesis with said best said cumulative score in a camera of said multi-camera configuration where said polished best scoring pose hypothesis with said best said cumulative score originated.

8. The method of claim 7, further comprising selecting one of said polished best scoring pose hypothesis with said best said cumulative score stored in corresponding said originating camera, wherein said selection is made from said camera having said polished best scoring pose hypothesis stored therein with a highest said cumulative score compared to all of said best said cumulative scores associated with each of said cameras.

9. The method of claim 8, further comprising applying said highest cumulative scoring pose hypothesis to entire said distributed aperture having said multi-camera configuration.

10. The method of claim 1, further comprising stitching poses using a scale factor obtained from each camera and evaluated in all cameras, wherein said scale factor determined to have a best scoring cumulative score is used for entire said distributed aperture having said multi-camera configuration.

11. A distributed aperture system for tracking a three-dimensional pose based on video captured using a multi-camera configuration, comprising:
   means for generating a plurality of pose hypotheses in each camera of said multi-camera configuration;
   means for transferring said plurality of pose hypotheses generated in each camera to all cameras in said multi-camera configuration;
   means for scoring each of said plurality of pose hypotheses generated in and transferred to each camera;
   means for determining a cumulative score for each of said plurality of pose hypotheses generated in and transferred to each camera;
   means for discarding least scoring pose hypotheses in each camera; and
   means for executing a pose refinement on a best scoring pose hypothesis remaining in each camera.

12. A non-transitory computer readable medium having stored thereon a plurality of instructions, the plurality of instructions including instructions which, when executed by a processor, cause the processor to perform the steps of a method for tracking a three-dimensional pose based on video captured in a distributed aperture having a multi-camera configuration, comprising the steps of:
   generating a plurality of pose hypotheses in each camera of said multi-camera configuration;
   transferring said plurality of pose hypotheses generated in each camera to all cameras in said multi-camera configuration;
   scoring each of said plurality of pose hypotheses generated in and transferred to each camera;
   determining a cumulative score for each of said plurality of pose hypotheses generated and transferred to each camera;
   discarding least scoring pose hypotheses in each camera; and
   executing a pose refinement on a best scoring pose hypothesis remaining in each camera.

* * * * *